United States Patent Office 3,337,502
Patented Aug. 22, 1967

3,337,502
PROCESS OF PREPARING A COPOLYMER OF A KETONE AND A KETENE USING A LITHIUM CATALYST
Giulio Natta, Giorgio Mazzanti, and Gianfranco Pregaglia, Milan, and Marco Binaghi, Varese, Italy, assignors to Montecatini Edison S.p.A., Milan, Italy, a corporation of Italy
No Drawing. Filed July 26, 1966, Ser. No. 567,837
Claims priority, application Italy, Mar. 4, 1960, 3,808/60; Oct. 4, 1961, 17,965/61
15 Claims. (Cl. 260—63)

This application is a continuation-in-part of applications Ser. Nos. 92,183, filed Feb. 28, 1961, and 228,228, filed Oct. 4, 1962.

The present invention relates to new polymers in which a portion of the monomeric units are obtained by the opening of the carbonyl double bond of a ketone. These polymers contain monomeric units corresponding to the formula:

wherein $R_1$ and $R_2$ are the same or different alkyl groups containing 1 to 5 carbon atoms or phenyl or aryl groups substituted with one or more electropositive radicals such as —$CH_3$ or with one or more electronegative radicals such as Cl. In addition to the monomeric units corresponding to the aforementioned general formula, these new polymeric products also contain monomeric units derived from ketenes having the following general formula:

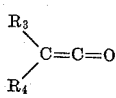

wherein $R_3$ and $R_4$ each reprsents alkyl groups containing 1 to 5 carbon atoms or phenyl or aryl groups substituted with one or more electropositive radicals such as —$CH_3$, or one or more electronegative radicals such as Cl.

It is known that ketenes can polymerize either by the opening of the carbon-to-carbon double bond or by the opening of the carbon-to-oxygen double bond.

It is also known that by reacting a ketene with a compound containing a carbonyl group (e.g., a ketone) in the presence of different catalysts, two series of low molecular weight compounds can be obtained. With catalysts of an acid nature, such as sulfuric acid, the compound containing the carbonyl group reacts in the enolic form thus yielding the ester of an unsaturated alcohol. A typical example is the reaction of acetone with a ketene, in the presence of sulfuric acid:

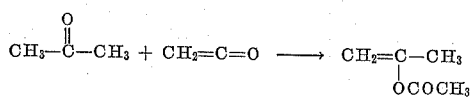

By using as catalysts compounds of the Friedel-Crafts type having a cationic activity, such as, e.g., $AlCl_3$ or $ZnCl_2$, the reaction between a ketene and a ketone leads, on the contrary, to the formation of substances containing 4-membered rings, corresponding to β-lactones. For instance, by reacting acetone with ketene in the presence of $ZnCl_2$, β-methyl-β-butyrolactone is obtained as is shown by the following:

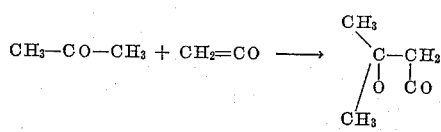

It has now surprisingly been found that high molecular weight linear macromolecules can be obtained by the copolymerization of a ketene with a ketone.

It has also been found that this copolymerization consists of an alternate polyaddition of the two monomers. In this copolymerization, the ketene reacts easily through the >C=C< double bond yielding monomeric units of the following type:

It has been shown, as will be illustrated hereinbelow, that the new copolymers of the present invention possess a regular chemical structure, which can be represented by the general formula:

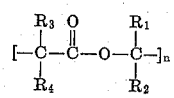

wherein $R_1$, $R_2$, $R_3$ and $R_4$ are as defined above.

The macromolecules which form the new polymeric products of the present invention consist therefore of long sequences of the type:

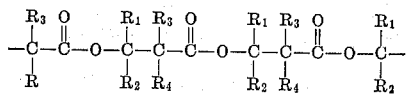

When $R_1$ is equal to $R_2$ and $R_3$ is equal to $R_4$, the polymers obtained are demonstrated to be highly crystalline by X-ray examination. Thus, e.g., the copolymerization product of acetone with dimethyl ketene, obtained according to the process of the present invention, is highly crystalline as demonstrated by X-ray examination, even if the X-ray examination is carried out on the polymer in the form of a non-oriented powder, obtained directly from the polymerization and not subjected to any particular annealing treatments. For this reason the products obtained by the copolymerization of ketenes with ketones, which are an object of the present invention, can be considered as belonging to the class of polyesters corresponding to the general formula:

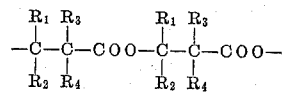

Polyesters corresponding to this formula, in which $R_1$, $R_2$, $R_3$ and $R_4$ are all different from hydrogen, were not known heretofore and have been prepared by us by said polymerization of keto-ketenes with ketones.

By intramolecular esterification of β-hydroxy-pivalic acid, Blaise and Marcilly (Bull. Soc. Chim. (3), 31, 308 (1904)) obtained a polymer having the following structure:

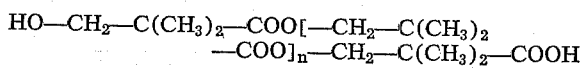

wherein $n$ is 4.

This product appeared as a microcrystalline powder, soluble in warm aqueous sodium hydroxide, easily saponifiable to hydroxypivalic acid and insoluble in most organic solvents.

The chemical structure of this polyester corresponds to that of a copolymer of ketene with acetone, obtained by the process of the present invention. It should however, be observed that the copolymerization products obtained by us possess a molecular weight much higher than that of the product isolated by Blaise and Marcilly. The products of the present invention are insoluble in warm sodium hydroxide, are scarcely saponifiable even at high temperatures and are soluble in boiling benzene.

The polymers obtained according to the process of this invention by copolymerization of ketones with keto-ketenes could not heretofore have been obtained by the methods then known.

The copolymers which are an object of the present invention consist of high molecular weight linear macromolecules, as demonstrated by the specific viscosity values of their chloroform solutions. Although the exact molecular weight cannot be easily calculated on the basis of these viscosity values, by also taking into account the insolubility in boiling acetone of some products obtained according to the process of the present invention, we may conclude that the new polymers possess a molecular weight at least higher than 10,000. It is known in fact that products having a polyester-like structure are insoluble in boiling acetone when they have a molecular weight higher than 10,000.

The composition of the new copolymers, corresponding to an equimolar content of ketenes and ketones, was determined by the elemental analysis of the products obtained and in some cases (e.g., for the copolymer of dimethyl ketene with acetophenone) this composition was also confirmed by physico-chemical analysis, e.g., by infrared spectrography.

The chemical structure of the new copolymers was shown by chemical methods. For example, in the case of the acetone-dimethylketene copolymer, the elemental analysis gave the following results:

VALUES FOUND ON ANALYSIS

C=65.98%    H=9.55%

VALUES CALCULATED BASED ON FORMULA

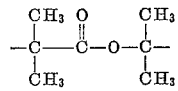

C=65.60%    H=9.44%

The regularity of enchainment of the two monomeric units can be deduced from the high crystallinity observed upon X-ray examination.

Moreover, by reducing this copolymer with LiAlH$_4$ in a tetrahydrofurane solution, we have isolated, with very good yields, a product which can be crystallized from low-boiling petroleum ether and which possesses a melting point of 138–140° C. The elemental analysis and the cryoscopic determination give results which agrees with the formula:

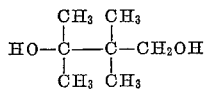

which corresponds to 1,1,2,2 - tetramethyl - propanediol-1-3. Infrared examination confirms the aforementioned formula.

The results of this hydrogenolysis show that the macromolecules of the starting dimethylketene-acetone copolymer consist of long sequences of the type:

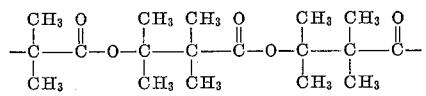

From the crude products, obtained by copolymerization of acetone and dimethylketene, fractions having a different molecular weight but possessing in any case the same crystalline structure, as demonstrated by X-ray examination, are isolated by extraction with suitable solvents. The solvents which can be used for this purpose are, e.g., acetone, diethyl ether, and benzene.

The copolymers of dimethyl ketene with acetone have a melting point of about 170° C. and melt without decomposition.

The copolymers of ketones with ketenes, aldoketenes or ketoketenes, which are an object of the present invention, are prepared by copolymerization of the monomers in the presence of catalysts comprising organometallic compounds of alkali metals, including lithium alkyls, aryls, alkylaryls, alkenyls and alkoxides, and compounds wherein the lithium is bound to a polycyclic hydrocarbon, or lithium hydrides, lithium amines or metallic lithium.

Examples of suitable catalysts include: methyl lithium, butyl lithium, amyl lithium, phenyl lithium, phenyl-ethyl lithium, lithium ethoxide, lithium isopropoxide, lithium butoxide, vinyl lithium, lithium hydride, lithium-aluminum hydride, lithium-naphthalene, LiNH$_2$ and the like.

Examples of suitable monomers are, among ketones, diethyl-ketone, methyl-ethyl-ketone, methyl-propyl-ketone, methyl - isopropyl - ketone, methyl - phenyl - ketone and, among ketenes, methyl-ethyl-ketene, diethyl-ketene, methyl-phenyl-ketene and the like.

The copolymerization, in accordance with the present invention, can be carried out at temperatures between −100° C. and room temperature, preferably between −80° and −30° C. It is convenient to operate at low temperature since at room temperature the reaction is too rapid and in some cases even explosive.

The copolymerization can be carried out as block-copolymerization in absence of solvents, but it is preferable to operate in the presence of a solvent which, by reducing the concentration of the monomer, causes a decrease in the reaction rate, which otherwise can be too high.

As diluents, solvents which do not react with the monomers or with the catalysts under the polymerization conditions and do not solidify at the reaction temperature can be used. For instance, propane, pentane, n-heptane, iso-octane, toluene or diethyl ether can be used.

The polymerization can be carried out under different operative conditions, either continuously or batchwise. The catalyst or its solution can be added to the monomer or to a monomer solution cooled to the polymerization temperature by regulating the rate at which the catalyst is added, depending on the particular activity of the catalyst used.

Depending on the polymerization methods, there can be some differences in the molecular weight of the polymers obtained as is shown by their different solubilities in organic solvents. Thus, by copolymerizing dimethyl-ketene and acetone in a toluene solution with the rapid addition of the catalyst, a polymer is obtained which is extractable with boiling acetone to the extent of 50% and is completely extractable with boiling ether. On the other hand, by operating under controlled conditions, e.g., by slowly adding to a butyl lithium solution in toluene an equimolar acetone-dimethyl ketene mixture, a polymer extractable with boiling acetone only to the extent of 20% is obtained. A further ether extraction makes it possible to extract 4% of the starting polymer, while the residue of the ether extraction is completely extractable with benzene.

The copolymers of the present invention can be used in the field of plastics. The crystalline products, such as, e.g., the copolymer of dimethylketene with acetone, can be utilized for preparing oriented films and textile fibers. The fibers extruded from the molten mass can be easily recrystallized by treatment with water at 70–100° C.

*Example 1*

Into a large Pyrex glass graduated test tube provided with a ground glass stopper and a side-cock for the introduction of nitrogen, kept in a cooling bath at −78° C., there were introduced 10 cc. of dimethyl-ketene, freshly distilled in an inert atmosphere, 20 cc. of anhydrous toluene and 10 cc. of acetone, purified with KMnO$_4$ and rectified.

The mixture was agitated and 1 cc. of a 1.8 M butyl lithium solution in benzene was slowly added. After a few seconds, the reaction started with a remarkable development of heat.

By connecting the test tube with a mercury valve through the side cock, an over pressure inside the reaction vessel was avoided. After about 5 minutes, the development of heat was greatly reduced and the reaction mass was almost solid.

Also, the initially intense yellow color was diminished due to the disappearance of most of the dimethylketene monomer.

Upon adding methanol, the reaction mass became completely white but most of it remained undissolved in the form of a white powder. The product obtained was subjected to cold and warm washing. After drying, 8 g. of a white solid powder were isolated. The crude polymer was soluble in tetrahydrofuran and in warm dioxane, almost completely soluble in cold benzene, and a little less soluble in cyclohexane.

Upon X-ray examination, the crude polymer gave a diffraction spectrum corresponding to a highly crystalline structure. A sample heated in a glass tube on a copper block began to melt at about 160° C. without decomposition. A fractionation with hot solvents gave the following results:

|   | Percent |
|---|---|
| Acetone extract | 50 |
| Ether extract | 50 |

The polymer was not significantly altered by a prolonged heating with an aqueous-alcoholic NaOH solution. The intrinsic viscosity of the fraction soluble in ether, determined in chloroform at 30° C., was 0.37.

Example 2

By operating as described in the preceding example, 10 cc. of dimethylketene, 10 cc. of acetone and 40 cc. of toluene were introduced into the large test tube cooled to −78° C. The addition of 0.5 cc. of a 1.4 M butyl lithium solution caused a much slower polymerization reaction. After 12 hours, however, the mass was almost completely solid. It was coagulated and repeatedly washed with methanol.

After drying, 11.5 g. of a white polymer were obtained. 40% of the total product was extracted with warm acetone. The residue was completely extractable with warm ether. Both fractions were crystalline, as demonstrated by X-ray examination, and the carbon and hydrogen percentages determined by elemental analysis corresponded to a composition of the formula: $C_7H_{12}O_2$.

Example 3

A 100-cc. 3-necked flask provided with a stirrer and a dropping funnel with cooling jacket was immersed in a cooling bath at −78° C. 60 cc. of heptane and 1 cc. of a 0.96 M butyl lithium solution in petroleum ether were introduced under nitrogen into the flask; while a solution of 10 cc. of acetone, 8 cc. of dimethylketene and 20 cc. of n-heptane was prepared in the dropping funnel, which was also cooled with a saturated solution of $CO_2$ in methanol.

The mixture of monomers was slowly added dropwise while agitating the catalyst solution. As soon as the monomer mixture was contacted with the butyl lithium solution, the yellow color disappeared almost completely. The addition of the monomers was completed after about 30 minutes and the mass was allowed to stand for some hours before adding methanol. The dried polymer had a fibrous appearance and weighed 6 g. By fractionation with hot solvents, the following fractions were obtained:

|   | Percent |
|---|---|
| Acetone extract | 20 |
| Ether extract | 4.2 |
| Benzene extract | 74.3 |
| Residue from the extraction | 1.5 |

A sample of crude polymer was heated in a glass tube on a copper block. Only at a temperature above 165° C. did the mass begin to melt.

Example 4

10 cc. of dimethylketene and 16 cc. of acetophenone, dissolved in 40 cc. of anhydrous toluene, were reacted by operating as described in Example 1. As a catalyst, 0.1 cc. of a 3.6 M solution of butyl lithium in petroleum ether was used. The cooling bath was kept at −20° C. in order to avoid the separation of acetophenone in the solid state.

A few minutes after the beginning of the polymerization, the viscosity of the solution increased quickly and a white solid was slowly formed on the bottom of the reaction vessel.

After one night, the mass was almost completely solidified. The polymer, after coagulation with methanol and drying, weighed 17 g. It was soluble in carbon tetrachloride, benzene, cylohexanone and cyclohexane at a temperature of 30° C., while its solubility in tetrahydrofuran was a little lower.

Upon X-ray examination, the crude polymer did not appear to be crystalline. The product did not undergo alteration upon heating up to 160° C., but it then softened within a range of 30° C. Fractionation with hot solvents made it possible to separate the following extracts:

|   | Percent |
|---|---|
| Acetone extract | 93 |
| Ether extract | 4.5 |
| Residue extract | 2.5 |

The last fraction had an intrinsic viscosity, determined in chloroform at 30° C., of 0.206.

Example 5

Into a 200-cc. large test tube, as described in Example 1, 80 cc. of heptane, 20 cc. of dimethyl ketene and 20 cc. of p-chloroacetophenone were successively introduced while agitating.

The test tube was immersed in a methanol bath saturated with $CO_2$, and 0.2 cc. of a 0.96 M solution of butyl lithium in low boiling petroleum ether was added.

In order to obviate the poor solubility of p-chloroacetophenone at the low temperature, the cooling bath was kept at −20° C. The mass slowly solidified and the initial color became less intense. After 12 hours, the polymer was coagulated with methanol.

The initially spongy polymer became granular. It was carefully washed with cold and warm methanol. After drying, 18 g. of white polymer were obtained. The polymer, upon quantitative analysis, showed the presence of chlorine and was amorphous, as demonstrated by X-ray examination.

A sample, heated in a small tube on a copper block, remained unaltered up to 140° C. and then became slowly viscous, but remained colorless.

Example 6

Acetone and dimethylketene were reacted as described in Example 1, with a molar ratio of about 10:1. More particularly, 30 cc. of acetone and 3 cc. of dimethylketene were reacted.

2 cc. of a 0.15 M butyl lithium solution in benzene were added to the solution of the two monomers kept at −80° C.

The temperature of the reaction vessel was then adjusted to −60° C. After 1 hour, the mass was completely gelled. After 8 hours, a white powdery polymer was precipitated with methanol. After washing and drying, the polymer weighed 2.9 g.

A sample of the crude product presented an X-ray diffraction spectrum identical with that of the copolymer obtained in Example 1, wherein an equimolar ratio of the monomers was employed. The infrared examination also showed that the polymers, obtained by using different ratios of the two monomers, had the same structure.

Example 7

6 cc. of dimethylketene and 30 cc. of acetophenone were dissolved in 60 cc. of heptane at −20° C. By operating as described in Example 1, 0.3 cc. of a 0.95 M butyl lithium solution in petroleum ether was added. The polymerization product was coagulated and washed. The product weighed 2.4 g.

The infrared spectrum was identical with that of the polymer obtained in Example 4 from an equimolar mixture of the monomers.

Example 8

10 cc. of dimethylketene in 40 cc. of heptane, 9.2 cc. of acetone and 0.2 g. of $C_4H_9OLi$ were introduced into a 250-cc. glass flask, provided with a mechanical agitator, immersed in a bath at −40° C. A slow progressive cloud, with the formation of a fine precipitate, was observed.

After 2 hours and 30 minutes, methanol was added, thus obtaining 13.1 g. of a white powdery polymer.

The product appeared to be highly crystalline as determined by X-ray examination. The polymer was fractionated with various solvents at their boiling points, thus obtaining the following fractions having different molecular weights:

|  | Percent |
|---|---|
| Ether extract | 13.38 |
| Heptane extract | 17.12 |
| Heptane residue | 69.50 |

The infrared absorption spectrum of the crude polymer and of all these fractions showed a high absorption at 5.80μ.

Example 9

By operating as described in Example 8, 0.1 g. of $C_4H_9OLi$ were added to a solution of 5 cc. of dimethylketene and 4.6 cc. of acetone in 20 cc. of n-heptane. The temperature was kept at −40° C. After a few minutes, a rise in temperature was observed and the viscosity of the solution increased.

Agitation was continued for an additional 45 minutes, and the dissolved polymer was then coagulated by addition of methanol, to thereby finally obtain 4.0 g. of crystalline copolymer.

Examples 10 to 13

The copolymerization was carried out under the conditions of Example 8, using as the catalyst $C_4H_9OLi$, but varying the temperature and the solvents.

The results obtained are reported in the following table, in which DM stands for dimethylketene and DME stands for dimethoxyethane.

| Ex. No. | DM, cc. | Acetone, cc. | $C_4H_9OLi$, g. | Solvent, cc. | T., °C. | Time, min. | Polymer, g. |
|---|---|---|---|---|---|---|---|
| 10 | 5 | 4.6 | 0.1 | n-Heptane, 20 | −78 | 90 | 5.35 |
| 11 | 5 | 4.6 | 0.1 | do | −20 | 90 | 3.9 |
| 12 | 10 | 9.3 | 0.056 | Ether, 40 | −78 | 120 | 10.5 |
| 13 | 5 | 4.6 | 0.040 | DME, 20 | −78 | 30 | 6.9 |

Example 14

By operating under the conditions described in Example 8, 0.08 g. of metallic lithium were added to a solution of 7 cc. of dimethylketene and 8 cc. of acetone in 30 cc. of toluene.

The temperature of the reaction apparatus was kept at −35° C. After some minutes, the yellow color began to decrease in intensity while the viscosity of the solution increased. After 45 minutes, the reaction was stopped and, after precipitation and washing, 3.5 g. of a white crystalline polymer were obtained.

Example 15

Operating under the same conditions as described in Example 8, 2 millimols of lithium naphthalene were added to a solution of 20 cc. of dimethylketene and 18.4 cc. of acetone in 120 cc. of toluene. The temperature of the apparatus was kept at −78° C.

After 1 hour and 30 minutes, during which time the viscosity of the reaction mixture had increased remarkably, methanol was added. After filtration and washing, 22.6 g. of a white crystalline polymer were obtained.

Example 16

Into a 500-cc. glass reaction flask provided with a mechanical agitator and immersed in a bath at +10° C., 30 cc. of dimethylketene, 100 cc. of acetone and 0.16 g. of $C_4H_9OLi$ were introduced.

After a few minutes, a remarkable rise in temperature was observed. After 90 minutes, methanol was added, thus obtaining a crystalline polymer, with a yield of 79.5%.

Example 17

Into a 500-cc. glass reaction flask provided with a mechanical agitator and a reflux condenser, 90 cc. of propylene, 20 cc. of dimethylketene, 16.6 cc. of acetone and 0.16 g. of $C_4H_9OLi$ were introduced. The temperature of the flask was kept at −50° C.

After a few minutes, a progressive cloud was formed, while the solvent began to boil moderately.

After 2 hours, methanol was added, and 10.80 g. of a white crystalline polymer were obtained.

Variations can of course be made without departing from the spirit of our invention.

Having thus described our invention, what we desire to secure and hereby claim by Letters Patent is:

1. A process for preparing a linear copolymer consisting essentially of monomeric units of the formula $$\begin{array}{c} R_1 \\ | \\ -C-O- \\ | \\ R_2 \end{array}$$

and monomeric units of the formula $$\begin{array}{c} R_3 \;\; O \\ | \;\;\; \| \\ -C-C- \\ | \\ R_4 \end{array}$$

and having a molecular weight in excess of about 10,000, which comprises polymerizing a ketone of the formula $$\begin{array}{c} R_1 \\ \diagdown \\ \;\;\;\;\;\;C=O \\ \diagup \\ R_2 \end{array}$$

wherein $R_1$ and $R_2$ are each selected from the group consisting of alkyl and aryl groups, with a ketene of the $$\begin{array}{c} R_3 \\ \diagdown \\ \;\;\;\;\;\;C=C=O \\ \diagup \\ R_4 \end{array}$$

formula: wherein $R_3$ and $R_4$ are each selected from the group consisting of alkyl and aryl groups, in the presence of a catalyst selected from the group consisting of a lithium alkyl, a lithium aryl, a lithium alkylaryl, a lithium alkenyl, a lithium alkoxide, a compound wherein lithium is bound to a polycyclic hydrocarbon, a lithium hydride, a lithium amine, and metallic lithium, at a temperature between $-100°$ C. and about $+18°$ C.

2. The process of claim 1 wherein the process is carried out in the presence of a solvent which is inert with respect to the monomers and the catalyst.

3. The process of claim 2 wherein the solvent is selected from the group consisting of aliphatic hydrocarbons, aromatic hydrocarbons and ethers.

4. The process of claim 1 carried out in absence of any inert solvent, using an excess of ketone.

5. The process of claim 1 wherein the temperature is from about $-30°$ C. to $-80°$ C.

6. The process of claim 1 wherein the polymeric product is coagulated by the addition of an alcohol and then separated.

7. The process of claim 1 wherein the ketone is acetone and the ketene is dimethylketene.

8. The process of claim 1 wherein the ketone is acetophenone and the ketene is dimethylketene.

9. The process of claim 1 wherein the ketone is p-chloroacetophenone and the ketene is dimethylketene.

10. The process of claim 1 wherein the ketone is acetone and the ketene is methylethylketene.

11. The process of claim 1 wherein the ketone is methyl-ethylketone and the ketene is dimethylketene.

12. The process of claim 1 wherein the catalyst is lithium butoxide.

13. The process of claim 1 wherein the catalyst is metallic lithium.

14. The process of claim 1 wherein the catalyst is lithium naphthalene.

15. The process of claim 1 wherein the catalyst is lithium butyl.

No references cited.

WILLIAM H. SHORT, *Primary Examiner.*

L. L. LEE, *Assistant Examiner.*

UNITED STATES PATENT OFFICE
CERTIFICATE OF CORRECTION

Patent No. 3,337,502                      August 22, 1967

Giulio Natta et al.

It is hereby certified that error appears in the above numbered patent requiring correction and that the said Letters Patent should read as corrected below.

Column 1, line 39, for "reprsents" read -- represents --; column 2, lines 25 to 28, for the bottom left-hand portion of the formula reading $$\underset{R}{|} \quad\quad \text{read} \quad\quad \underset{R_4}{|}$$

Signed and sealed this 20th day of August 1968

(SEAL)
Attest:

Edward M. Fletcher, Jr.                      EDWARD J. BRENNER

Attesting Officer                            Commissioner of Patents